//  // 
United States Patent [19]

Patoray

[11] Patent Number: 4,526,246

[45] Date of Patent: Jul. 2, 1985

[54] WATER-RESISTANT WEIGHING APPARATUS

[75] Inventor: Stephen A. Patoray, Spartanburg, S.C.

[73] Assignee: Reliance Electric Company, Cleveland, Ohio

[21] Appl. No.: 582,823

[22] Filed: Feb. 23, 1984

[51] Int. Cl.³ ..................... G01G 21/02; G01G 21/28
[52] U.S. Cl. ..................................... 177/179; 177/180
[58] Field of Search ........................ 177/179, 180, 211

[56] References Cited

U.S. PATENT DOCUMENTS

| | | | |
|---|---|---|---|
| 4,285,412 | 8/1981 | Wirth | 177/179 |
| 4,396,079 | 8/1983 | Brendel | 177/179 |
| 4,433,741 | 2/1984 | Ryckman, Jr. | 177/211 X |
| 4,453,607 | 6/1984 | Zink | 177/179 |

*Primary Examiner*—George H. Miller, Jr.

*Attorney, Agent, or Firm*—Roy F. Hollander

[57] ABSTRACT

Water-resistant weighing apparatus comprising a load cell having a plate, one or more beams with fixed ends connected to the plate and strain sensing means on the beams. A platter is supported by the beams for receiving a load applied between the plate and the beam. The platter encloses the top and sides of the load cell and a shield is connected to the bottom of the platter and encloses the bottom of the load cell. A gasket is provided to seal the interface between the platter and the shield. A plurality of feet are provided for contact with a support surface. Bushings extend through the shield and connect the plate to the feet and sealing boots are provided to seal the openings in the shield for the bushings. The shield may include a vent to expose the load cell to atmospheric pressure and a sub-base plate may be provided to deflect moisture from the bottom of the shield and the vent.

6 Claims, 7 Drawing Figures

WATER-RESISTANT WEIGHING APPARATUS

BACKGROUND ART

This invention relates to weighing apparatus and more particularly to a water-resistant, low profile weighing apparatus.

Industrial weighing scales are used in many different environments. In some cases they are subject to hostile enviroments and may be used to weigh corrosive substances. In other cases, such as meat packing plants, the environment must, by law, be maintained in a highly sanitary condition. In many cases the weighing area, including the weighing apparatus, may be washed down with water or liquid cleaning solutions delivered by hoses or the like at relatively high velocities. Since the accuracy of the weighing apparatus is affected by substantial amounts of moisture it is desirable, if not neccesary, to protect at least the sensitive parts of the weighing apparatus from excessive moisture. In the past this has usually been done by enclosing the strain gauges and other sensitive portions of the weighing apparatus in a water resistant environment.

Recently, weighing scales have been developed which are very economical to manufacture and have a very low profile making them desirable for a wide range of weighing applications. Examples of such weighing apparatus are disclosed in U.S. Pat. No. 4,261,429 to Lockery and in co-pending application Ser. No. 496,053 filed May 19, 1983. These scales have applications in the environments described above so that it is extremely desirable that the scales be able to withstand "washdown" without excessively affecting the accuracy.

DISCLOSURE OF THE INVENTION

An object of the present invention is to provide a water-resistant weighing apparatus of the type employing a load cell which includes a plate, at least one beam having a fixed end connected to the plate and strain sensing means on the beam.

A water resistant weighing apparatus according to this invention comprises a load cell, the load cell including a plate, a beam having a fixed end connected to the plate and strain sensing means on the beam for sensing strain induced by a load applied between the beam and the plate. A platter is supported by one of the plate and beam for receiving a load to be weighed and encloses the top and sides of plate. A shield is connected to the bottom of the platter and encloses the bottom of the plate and means is provided to seal the interface between the platter and shield. Foot means is provided for contact with a supporting surface. Bushing means extends through an opening in the shield and connects the other of the plate and beam to the foot means. Boot means is provided to seal the openings in the shield for the bushing means.

Preferably, a vent is provided in the shield to eliminate any pressure differential above and below it and a sub-base is provided below the shield to deflect liquid away from the shield.

GENERAL DESCRIPTION

Figure 3:
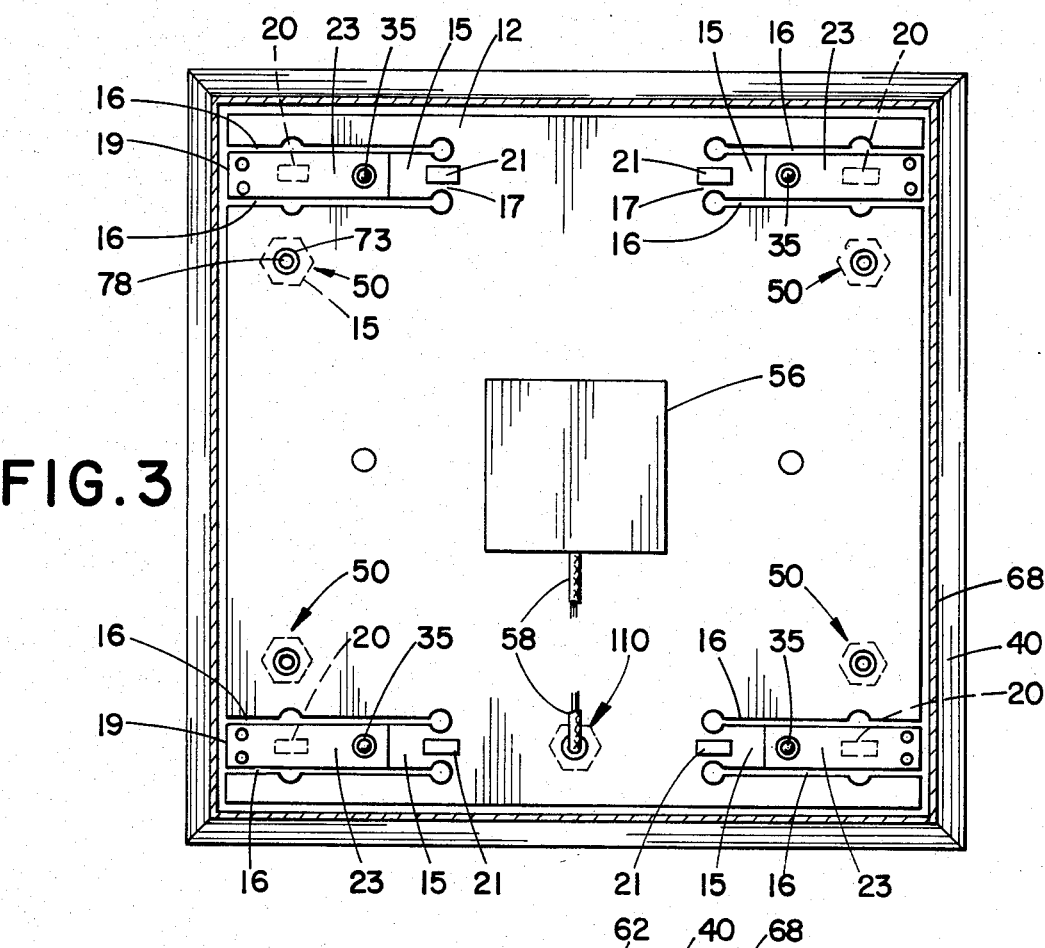
FIG. 3 is a sectional view of the water-resistant scale along line 3—3 of FIG. 2.
Figure 4:
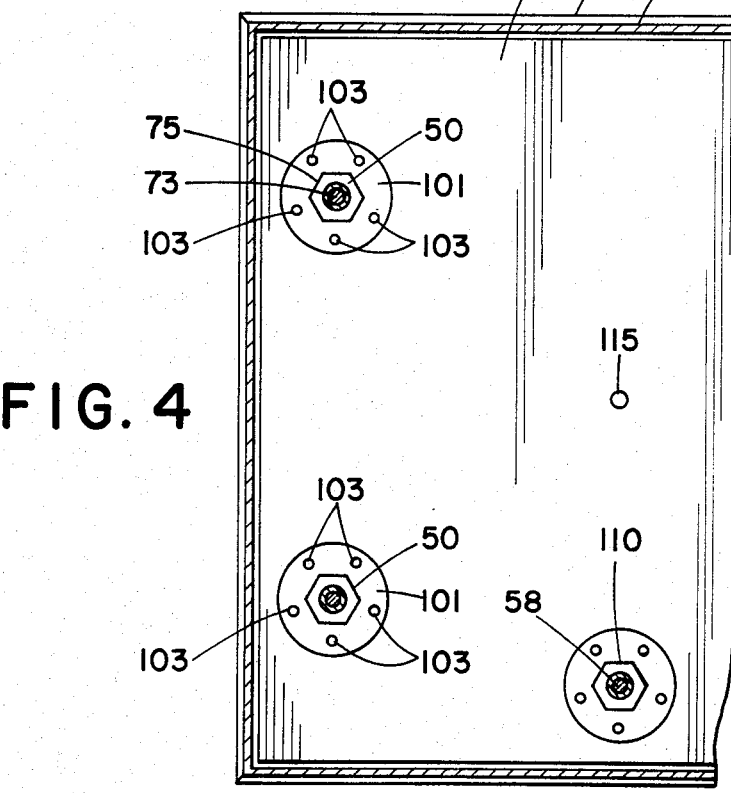
FIG. 4 is a partial sectional view of the water-resistant scale along line 4—4 of FIG. 2.

Referring now to the drawing, a water-resistant weighing scale according to the present invention includes a load cell generally designated by the numeral 10 including a plate 12, usually of aluminum. A bending beam 15 is formed adjacent at least one but preferably all four of the corners of the plate by slots 16 as best seen in FIG. 3. Each beam 15 has a fixed end 17 integral with or otherwise rigidly connected to plate 12 and a free end 19. Strain gages 20, 21 are provided on the upper surface of each beam 15. A bracket 23 has one end connected through a spacer 25 to the free end of each beam 15 and extends parallel to and above the beam. The other or free end of bracket 23 supports a deck 33 through a ball and cup arrangement 35. A platter 40 rests on deck 33. A thin sheet 43 of rubber or similar material is provided between platter 40 and deck 33 to prevent sideways slippage of platter 43 with respect to deck 33 and to provide more even and uniform contact between the two surfaces. The weight of an article placed on platter 40 will be transmitted through deck 33, ball and cup arrangement 35, bracket 23 and spacer 25 to the free ends 19 of the respective beams 15.

The plate 12, and the fixed end of each beam 15, is connected through a plurality of bushings 50, four being shown, to feet 52 which supports the weighing scale on any suitable surface. It will be evident from the foregoing brief description that the weight of an article positioned on platter 40 will be applied to the beams 15, producing strain in the beams proportional to the weight which is detected by strain gages 20 and 21. The respective strain gages 20, 21 are connected together, preferably in a bridge arrangement, on plate 12 as indicated diagrammatically at 56 in FIG. 3. The bridge so formed is connected by means of a cable 58 to an external source of bridge excitation and a weight indicating means (not shown).

The load cell 10 and weighing arrangements utilizing it are described fully in U.S. Pat. No. 4,261,429 to Lockery, which disclosure is incorporated herein by reference.

Figure 1:
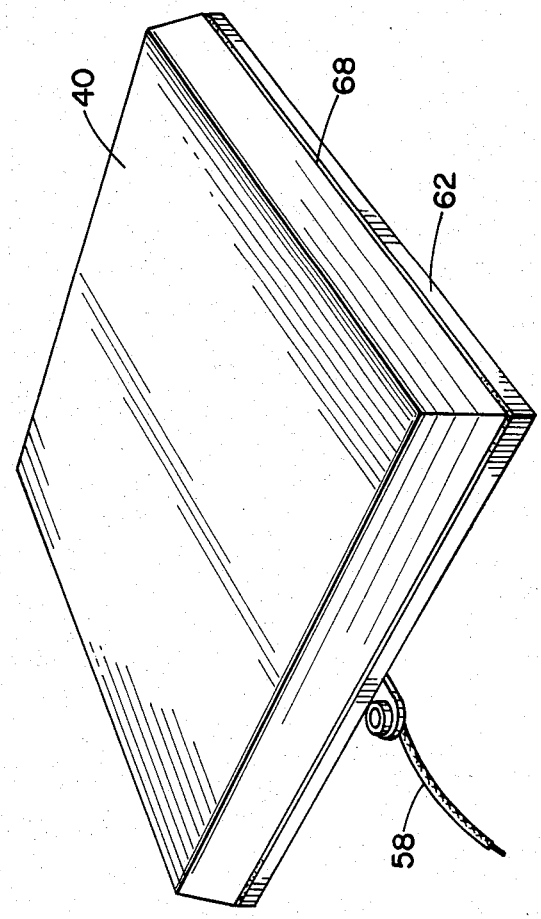
FIG. 1 is a perspective view of a water-resistant scale according to the present invention.
Figure 2:
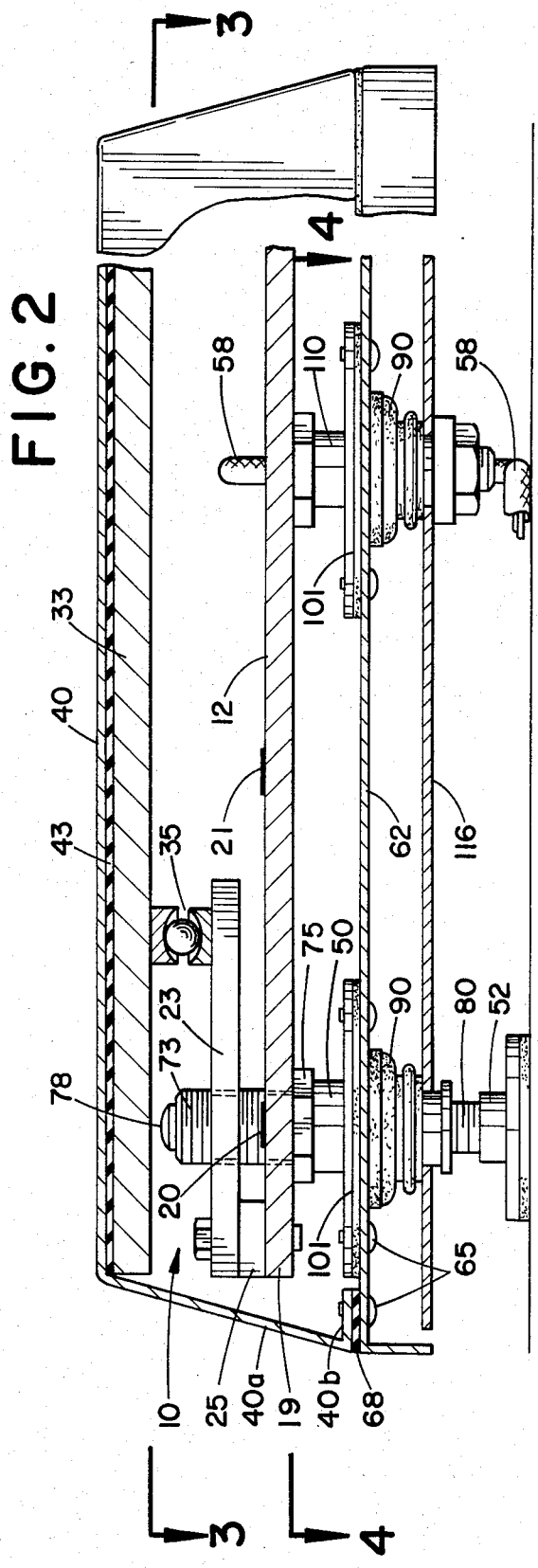
FIG. 2 is a side elevation, partly in section, of the water-resistant scale.

The accuracy of the weighing apparatus as thus far described would be adversely affected by excessive moisture. The arrangements described below substantially prevent such adverse effects. As shown in FIG. 2, platter 40 encloses or shields the sides as well as the top of load cell 10. Platter 40 has sides 40a terminating in an integral inwardly directed flange portion 40b. A platter shield 62 is provided to shield the entire bottom of the weighing scale and is fastened to flange portion 40b of platter 40 by several fastening means 65. A gasket 68 of rubber or similar water-proof materials seals the interface between platter flange portion 40b and platter shield 62.

As discussed above, the weight of an object placed on platter 40 is applied to the free ends 19 of the beams 15. The fixed ends of beams 15 are integral with plate 12 which is connected through bushings 50 and feet 52 to a support surface for the weighing apparatus. Each of bushings 50 must pass through openings in platter shield 62. These openings must be sealed to prevent ingress of moisture.

Figure 5:
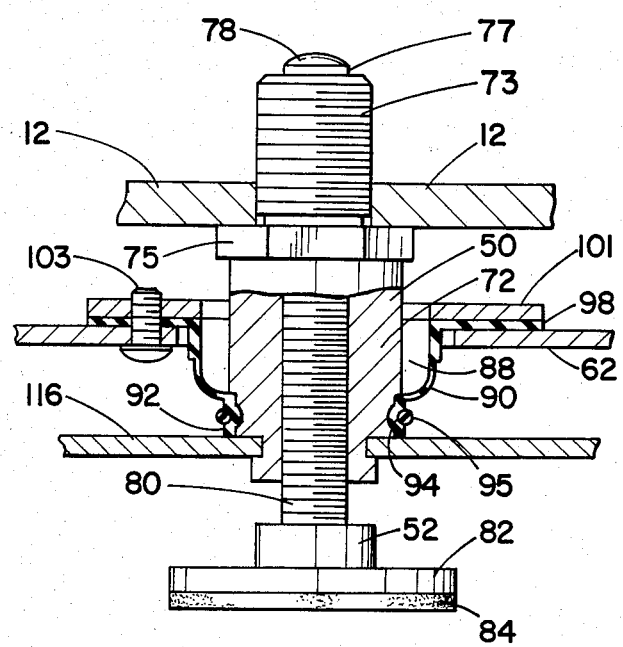
FIG. 5 is a large scale sectional view of the bushing, foot and sealing boot arrangement for the water-resistant scale.

As seen most clearly in FIG. 5, each bushing 50 includes a lower internally threaded portion 72 and an upper shaft portion 73 separated by a common hexagonal head 75. Plate 12 rests on the upper surface of heads 75. The upper portion 73 of bushing 50 extends through an opening in plate 12 and supports at its upper end a fitting 77 with an upper hemispherical surface 78. The fittings 77 of the various bushings serve as overload stops so that an excessive weight on platter 40 (FIG. 2) will cause deck 33 to bottom on hemispherical surfaces 78, bypassing the load directly to feet 52 and preventing overloading of beams 15. For this purpose the fittings 77 are selected and adjusted so that hemispherical surfaces 78 are at the desired distances below deck 33.

The internally threaded lower portion 72 of each bushing 50 receives the threaded shaft 80 of a foot 52. Each foot 52 also includes a flat cylindrical base 82 to which is attached a pad 84 of high friction, relatively resilient material such as rubber or the like. Pads 84 prevent slippage of the feet on the support surface and provide substantially even contact therewith.

The lower portion 72 of bushing 50 extends through an opening 88 in platter shield 62. A sealing boot 90 is provided to seal the opening and prevent the passage of significant moisture into the area above platter shield 62. Boot 90 includes a lower skirt portion 92 which is configured to fit tightly into a channel 94 formed in the outer surface of bushing 50. A clamp 95 seals the skirt portion 92 tightly to bushing 50. Above skirt portion 92, boot 90 flares upwardly and outwardly to a horizontally extending flange portion 98. Flange 98 is clamped tightly to platter shield 62 by means of a metal sealing ring 101 and a plurality of fasteners 103 such as rivets or the like. Sealing boot 90, clamped tightly to both bushing 50 and platter shield 62, prevents any significant amount of moisture from passing through opening 88 and affecting the weighing apparatus.

As shown in FIGS. 2 to 5, a cable bushing 110 provides a path for cable 58 from the inside to the outside of the sealed weighing apparatus. Cable bushing 110 is similar to bushings 50 but has no upper portion corresponding to portion 73 of bushing 50, nor does bushing 110 receive a support foot 52. The path through bushing 110 is sealed by means of potting compound or the like after cable 58 has been passed through it. Cable bushing 110, like bushings 50, passes through an opening in platter shield 62 which is sealed by a means of a boot and clamping ring arrangement exactly the same as boot 90 and clamping ring 101 employed in connection with bushings 50.

With the construction described the weighing apparatus is not only substantially moisture proof but also substantially air tight. A small vent opening 115 (FIG. 4) is provided through platter shield 62 to equalize the pressure on opposite sides of platter shield. A sub-base 116 is provided below platter shield 62 and serves as a splash guard to deflect liquid from the platter shield and vent 115. Sub-base 116 is supported in a circular channel formed in the lower portions 72 of the bushings 50. Vent opening 115 may be so small that it, particularly when shielded by sub-base 116, does not significantly reduce the moisture protection provided to the weighing apparatus by the sealing arrangement described.

Figure 6:
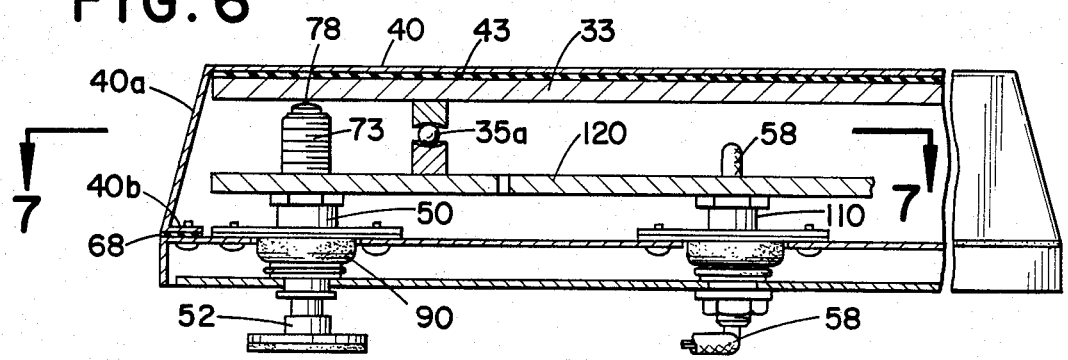
FIG. 6 is a side elevation, partly in section, of the water-resistant scale employing an alternate form of load cell.
Figure 7:
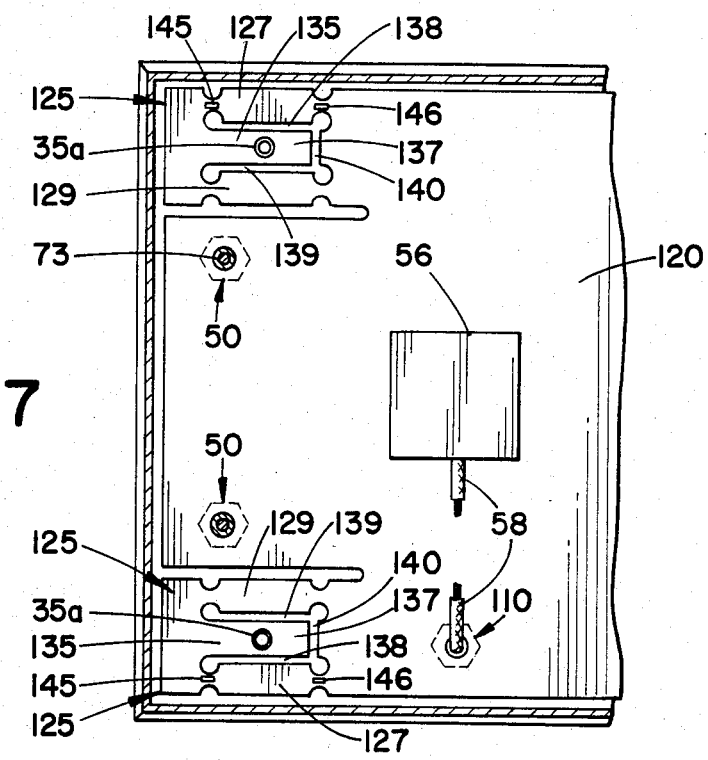
FIG. 7 is a partial sectional view along the line 7—7 of FIG. 6.

Referring now to FIGS. 6 and 7, there is shown an alternate embodiment of moisture-resistant weighing apparatus according to the present invention. The embodiment of FIGS. 6 and 7 utilizes a weighing apparatus including a plate 120 provided at each of its corners with a load cell beam structure generally designated 125. Each load cell beam structure 125 includes a bending beam 127 and a bending beam 129. Each beam 127, 129 has an end affixed to and merging with plate 120 and another end affixed to and merging with an end of a support member 135. The other end 137 of support member 135 is a free end defined by slots 138, 139 and 140. Strain gages 145 and 146 are mounted on one of the bending beams, in this case beam 127. Plate 120 with this load cell arrangement is the subject of copending application Ser. No. 496,053 filed May 19, 1983 of Griffen and Patoray which is assigned to the Assignee of the present invention. The disclosure of application Ser. No. 496,053 is incorporated herein by reference.

In the embodiment of FIGS. 6 and 7, bracket 23 of the embodiment of FIGS. 1–5 is not needed and ball and cup arrangement 35a extends between deck 33 and support member 135. Except for the use of plate 120 and its load cell arrangement and the absence of bracket 23 and spacer 25, the embodiment of FIGS. 6 and 7 is substantially the same as that of FIGS. 1–5. Plate 120 is suported by bushings 50 and feet 52 in the same manner as described above in connection with FIGS. 1–5. Likewise, the sealing arrangement using boots 90 is identical, as is the cable bushing 110 and boot sealing arrangement for cable 58. Platter shield 62 is the same as in the embodiment of FIGS. 1–5 including vent 115 and splash guard sub-base 116 is again provided to protect platter shield 62 from direct liquid sprays. The absence of bracket 23 and spacer 25 of FIGS. 1–5 permits the weighing apparatus of FIGS. 6 and 7 to be somewhat lower in profile then the embodiment of FIGS. 1–5 and somewhat more economical to manufacture.

What is claimed is:

1. Water-resistant weighing apparatus comprising a load cell, said load cell including a plate, a beam having a fixed end connected to said plate and strain sensing means on said beam, a platter supported by one of said plate and beam for receiving a weight, said platter enclosing the top and sides of said load cell, a shield connected to the bottom of said platter and enclosing the bottom of said load cell, means sealing the interface between said platter and said shield, foot means for contact with a support surface, bushing means extending through said shield and connecting the other of said plate and beam to said foot means, and boot means sealing the interface between said bushing means and said shield to prevent moisture from passing said shield.

2. Apparatus as claimed in claim 1 including a vent opening in said shield to eliminate pressure differentials.

3. Apparatus as claimed in claim 2 including a sub-base plate mounted below said shield to deflect liquid away from said vent.

4. Apparatus as claimed in claim 1 including a cable for connection of said strain gauges to an indicator, a cable bushing extending through said shield and providing a path for said cable, and cable boot means for sealing the interface between said cable bushing means and said shield.

5. Apparatus as claimed in claim 1 including a deck plate between said platter and said one of said plate and beam, and lining means between said deck plate and said platter.

6. Apparatus as claimed in claim 1 wherein said boot means includes a skirt portion embracing said bushing below said shield, and a flange portion above said shield and including a clamping ring for clamping said flange portion to the upper surface of said shield to prevent the passage of moisture beyond said shield.

* * * * *